United States Patent
Bou et al.

(10) Patent No.: US 8,188,396 B2
(45) Date of Patent: May 29, 2012

(54) SCADA READY FIELD TEST SWITCH

(75) Inventors: Jimmy Bou, Safety Harbor, FL (US); Michael Edward Haas, New Port Richey, FL (US); Brian Sonnenberg, Clearwater, FL (US)

(73) Assignee: General Electric Company, Schenectady, NY (US)

( * ) Notice: Subject to any disclaimer, the term of this patent is extended or adjusted under 35 U.S.C. 154(b) by 489 days.

(21) Appl. No.: 12/356,601

(22) Filed: Jan. 21, 2009

(65) Prior Publication Data

US 2010/0181179 A1 Jul. 22, 2010

(51) Int. Cl.
*H01H 9/08* (2006.01)

(52) U.S. Cl. ................. 200/305; 200/554

(58) Field of Classification Search ........ 200/1 R, 200/6 R, 16 R, 16 E, 16 F, 17 R, 18, 48 R, 200/48 KB, 252, 254, 308, 334; 307/64; 324/141, 142, 156, 754; 361/622, 627, 664, 361/667, 727; 439/517

See application file for complete search history.

(56) References Cited

U.S. PATENT DOCUMENTS

| | | | |
|---|---|---|---|
| 2,532,647 A * | 12/1950 | Sillers | 340/644 |
| 4,635,013 A * | 1/1987 | Lemarquand et al. | 335/20 |
| 4,777,479 A * | 10/1988 | Hinckley | 340/644 |
| 4,880,395 A | 11/1989 | Eriksson et al. | |
| 5,334,931 A | 8/1994 | Clarke et al. | |
| 5,722,534 A * | 3/1998 | Wright | 200/305 |
| 5,874,900 A * | 2/1999 | Panto | 340/644 |
| 6,384,350 B1 * | 5/2002 | Shincovich et al. | 200/5 A |
| 6,836,108 B1 * | 12/2004 | Balko et al. | 324/142 |
| 7,302,752 B2 * | 12/2007 | Ball | 29/622 |
| 7,479,029 B2 | 1/2009 | Cook et al. | |
| 7,563,999 B2 * | 7/2009 | Ball et al. | 200/293 |
| 2006/0202858 A1* | 9/2006 | Holle et al. | 340/870.02 |

FOREIGN PATENT DOCUMENTS

CN 201656264 U * 11/2010

OTHER PUBLICATIONS

Facilities Instructions, Standards, and Techniques; vol. 3-8; Field Test Procedure for Protective Relays; United States Department of the Interior Bureau of Reclamation; Nov. 1991; Facilities Engineering Branch Denver Office, Denver, Colorado.

* cited by examiner

*Primary Examiner* — Michael Friedhofer

(74) *Attorney, Agent, or Firm* — GE Global Patent Operation; Catherine J. Toppin

(57) ABSTRACT

A monitored SCADA Ready Field Test (FT) Switch is disclosed. The monitored switch relates to the incorporation of a monitoring switch for each switch unit in a FT switch to monitor the position of the corresponding switch unit and the FT switch, generally.

12 Claims, 5 Drawing Sheets

SCADA READY FIELD TEST SWITCH

BACKGROUND OF THE INVENTION

In the deployment of large electrical networks and substations systems, testing of the operation of the network and systems is critical to insure proper deployment and operation. Current Field Test (FT) switches provide a simple, immediate and reliable device for isolating industrial equipment and measuring system current and voltage during field testing. Current FT switches, such as the FT-76, manufactured by the General Electric Company, Schenectady, N.Y., includes features necessary for applications involving the measurement of individual currents and voltages to facilitate testing of substation instrumentation and protection devices from the front of an electrical panel. The make-before-break current short circuit feature of the FT-76 allows test personnel the convenience of isolating equipment from current transformer circuits.

In a SCADA (Supervisory, Control and Data Acquisition) system, the FT switch provides a means for providing a reliable means for performing necessary real-live monitoring of the FT switch position. However, because the switches are configured based on the conditions of the subsystem in which they are deployed and because there is redundancy built-in to the switch, there are a number of situations, particularly in the deployment phase, wherein the configuration of the FT switch while appearing to be installed properly, in fact is mis-configured. Another situation may occur wherein after testing of a particular switch, the particular switch is left in an incorrect state and, thus, the FT is mis-configured.

Hence, a device is needed for determining the configuration state of each of the switches within a deployed FT switch.

SUMMARY OF THE INVENTION

As described herein, the embodiments of the present invention overcome one or more of the above or other disadvantages known in the art.

One aspect of the present invention relates to the incorporation of a monitoring switch for each switch unit in a FT switch to monitor the position of the switch unit.

Another aspect of the present invention provides for the output of each monitoring switch to be configured to indicate a mis-configuration of the FT switch or of individual switch elements.

In another aspect of the present invention the status of the FT switch and/or individual switches may be remotely monitored.

These and other aspects and advantages of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein.

DETAILED DESCRIPTION OF THE PREFERRED EMBODIMENTS OF THE INVENTION

Figure 1:
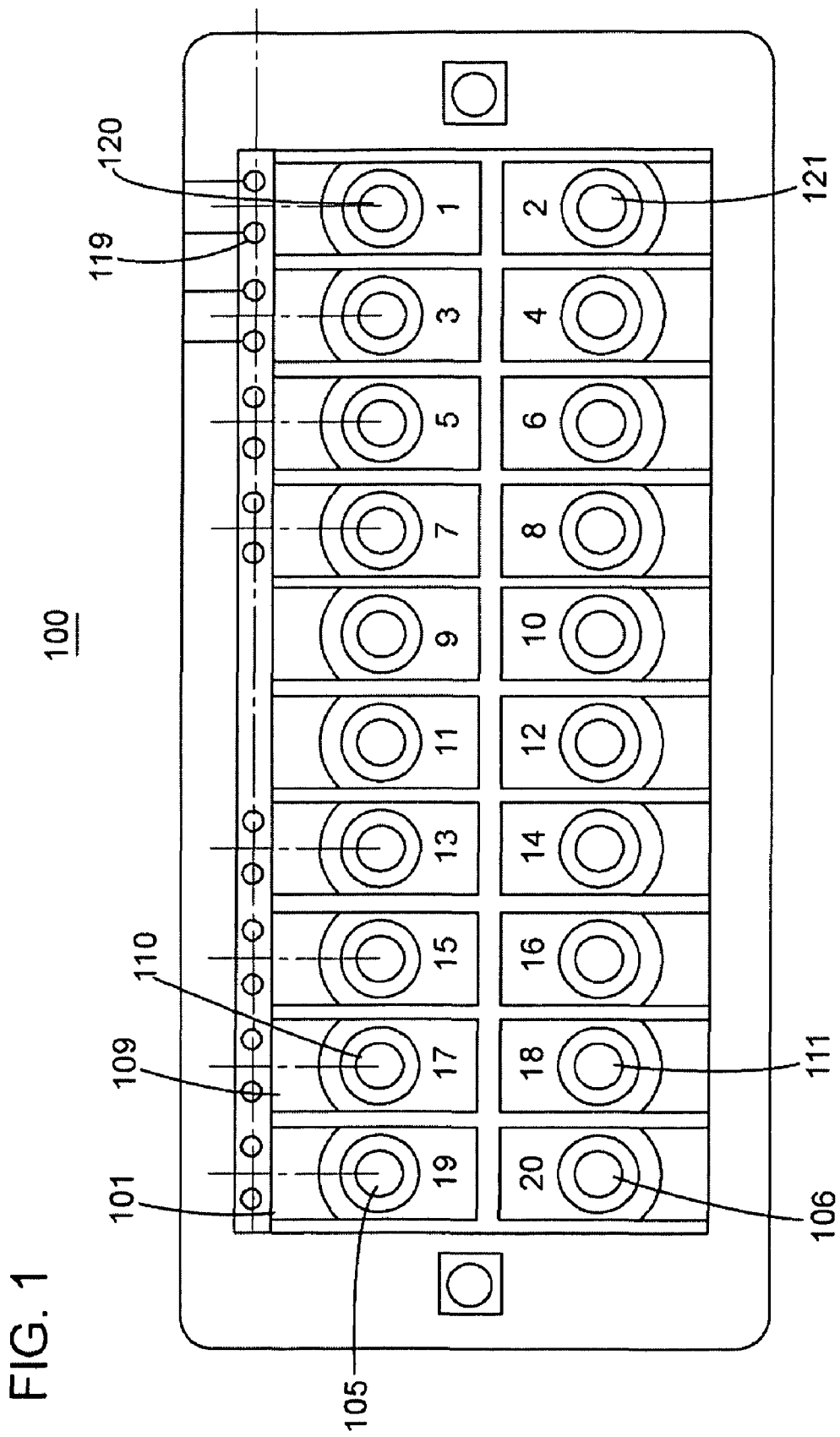
FIG. 1 illustrates a back panel of a conventional FT switch.

FIG. 1 illustrates a back panel of a conventional FT switch 100. An FT switch is available in a plurality of configurations, ranging from 1 to up to 10 individual switch units; switch unit 101 109 and 119. Each switch unit is conventionally identified by a letter (A-J). Each switch unit includes two terminals e.g., 105, 106 for switch unit 101. The individual switch units are of the knife blade type, typically including a Non-shorting blade or a shorting blade. The knife blade switches can be operated independently or ganged together with a horizontal interlocking.

Figure 2:
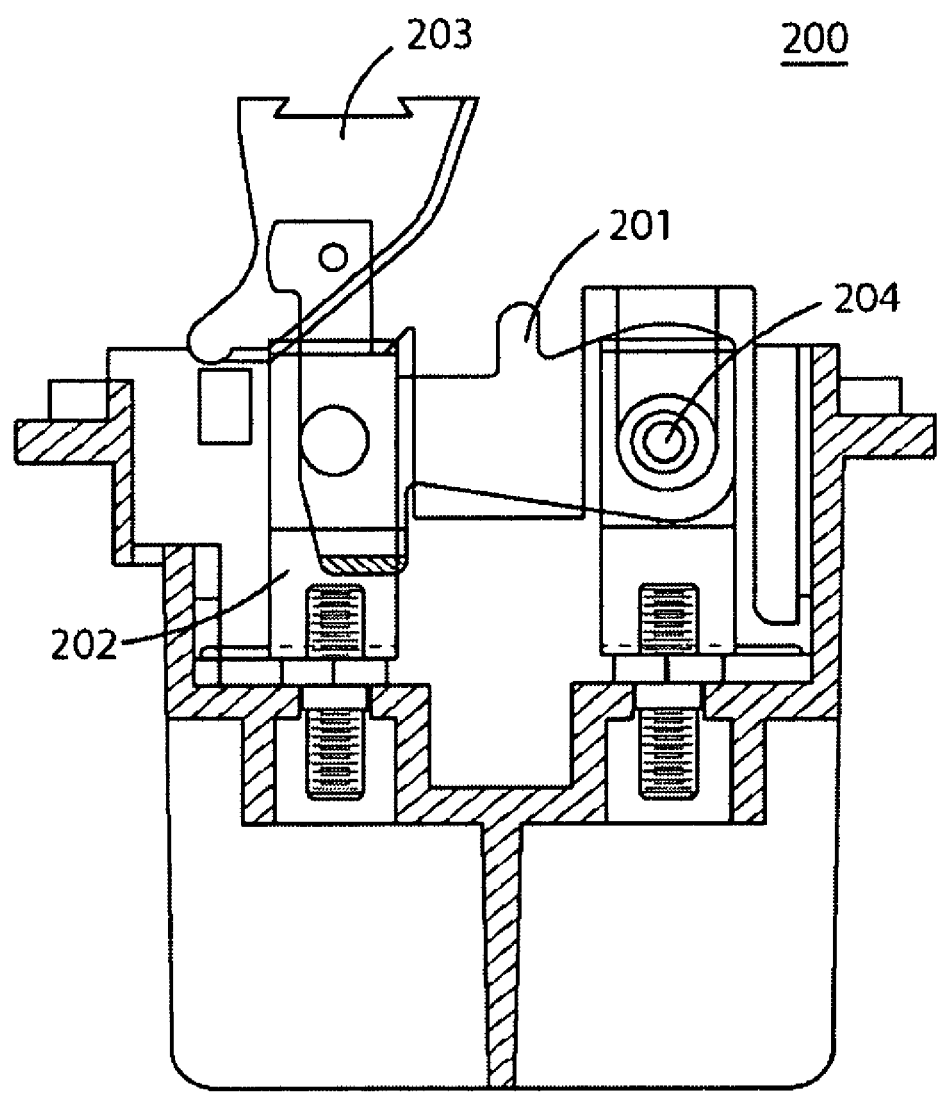
FIG. 2 illustrates a side view of a switch within a conventional FT switch.

FIG. 2 illustrates a side-view of an individual switching unit 200 of the FT switch 100. The knife switch blade 201 is shown in the closed position which is represented by the blade being connected to jaw 202. When connected, the blade 201 shorts one terminal to the other (e.g., 105, 106, FIG. 1) which in turn connects a relay or meter to the Potential Transformer (PT) or Current Transformer (CT). The handle lever 203 comprises an insulative material such as that sold under the mark Valox for insulation from voltage and controls the position of blade 201. Blade 201 rotates on bearing 204 to engage and disengage blade 201 from jaw 202. With knife switch blade 201 in the engaged position, an operator or user can clip leads or use a test plug to record current and voltage data from each FT switch poles.

Figure 3:
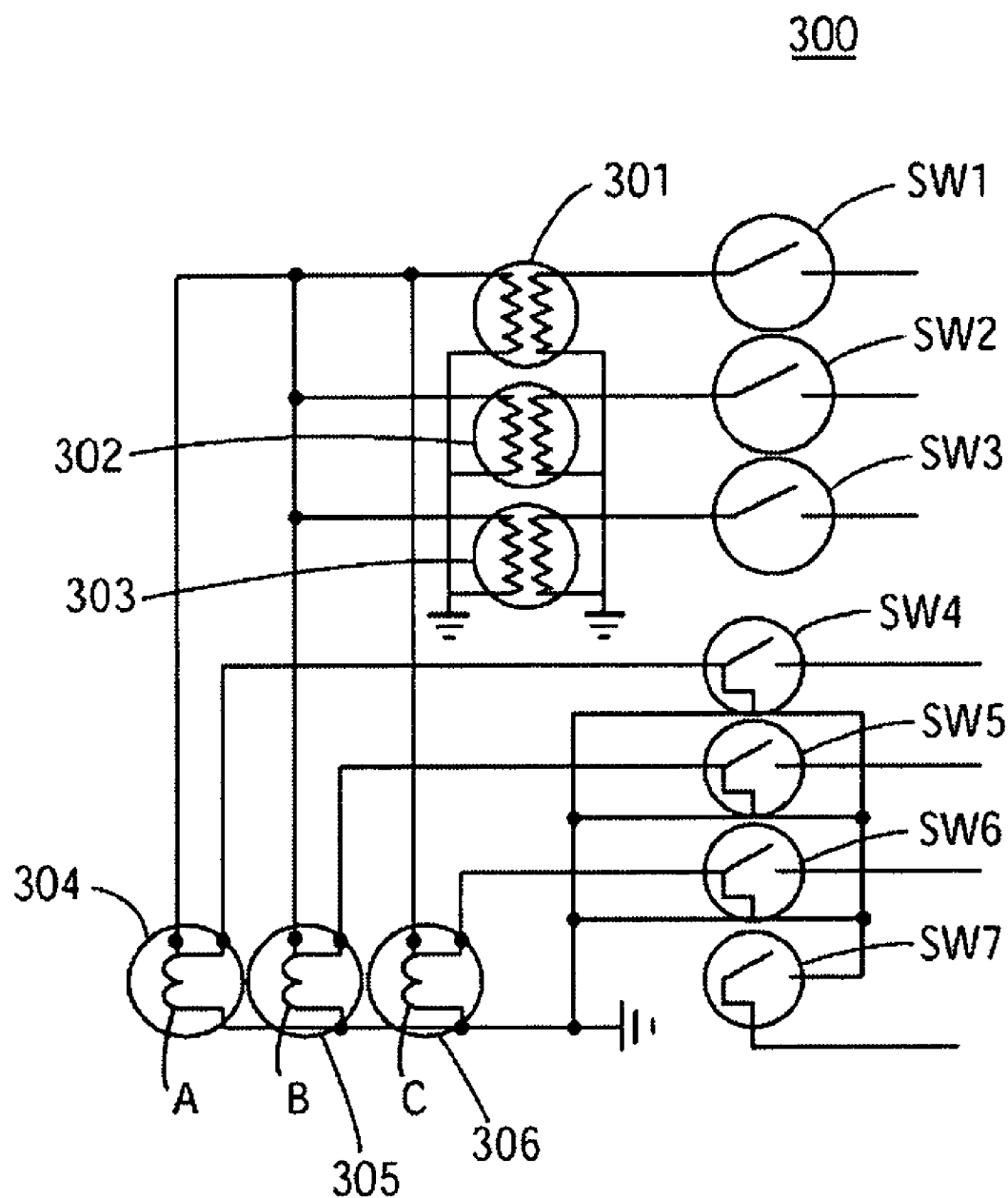
FIG. 3 illustrates a schematic drawing of an exemplary FT switch configuration.

FIG. 3 illustrates an exemplary schematic interconnection diagram of a conventional 10-pole FT switch. In this illustrated example, switches SW1, SW2, SW3 are single-pole switches associated with transformers 301, 302, and 303, respectively. Switches SW4, SW5 and SVV6 represent ganged switches that are associated with transformers 304, 305 and 306, respectively. Switches SW4, SW5 and SW6 each allow for the opening of one of the ganged switches to provide a test path for testing transformers 304, 305 and 306, respectively. Switch SW7 is placed in series with output of each of switches 304, 305, and 306. For current measurements with CTs, two switch poles must be used per CT to avoid the possibility of leaving a CT OPEN and creating a high voltage hazard at the CT terminals. Opening of one of the two switch poles per CT will allow for the testing of current without shutting down power.

Figure 4:
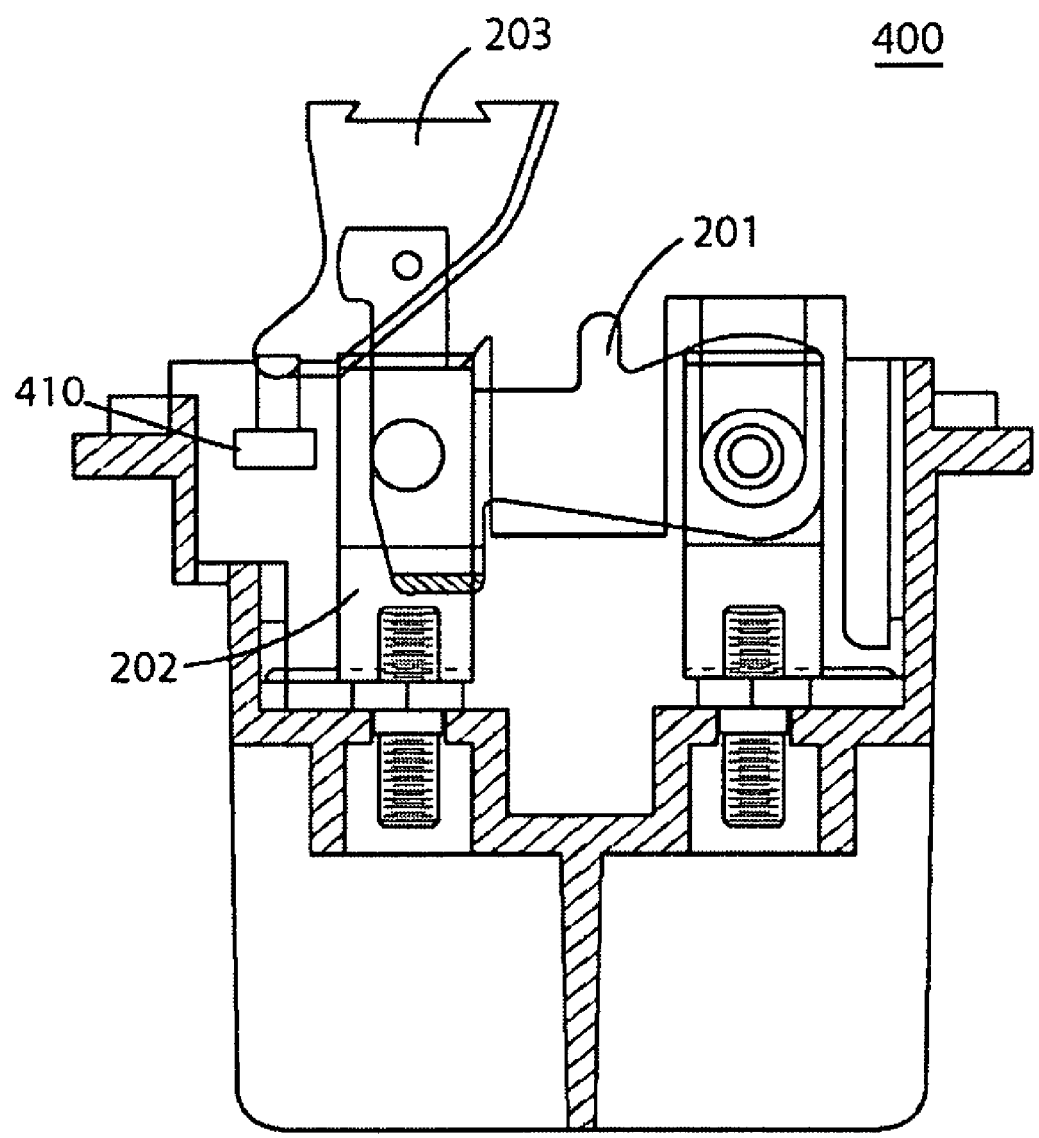
FIG. 4 illustrates a side view of a switch in accordance with the principles of the invention.

FIG. 4 illustrates a side view of an individual switch 400 in a FT switch in accordance with the principles of the invention. As FIG. 4 illustrates a switch similar to that shown in FIG. 2, elements previously described in FIG. 2 are not discussed in detail again.

Referring to FIG. 4, a switch element 410, is incorporated into switch 400. Switch 410 represents a monitoring switch, which when engaged by the positioning of knife switch blade 201 into an engaged position, causes switch 410 to be in a closed (engaged) position. When knife switch blade 201 is disengaged, switch 410 is opened and a flow of current through switch 410 is prevented. The SCADA system may be configured to set an alarm if the current flow is not detected. By connecting the switches 410 in series, for example, if any momentary switch is open an alarm will alert the system to not restore power. As illustrated, handle lever 203 engages switch 410 with blade 201. In one aspect of the invention, switch 410 may be a momentary switch that is disengaged when lever 203 is positioned to disengage knife switch 201.

Figure 5:
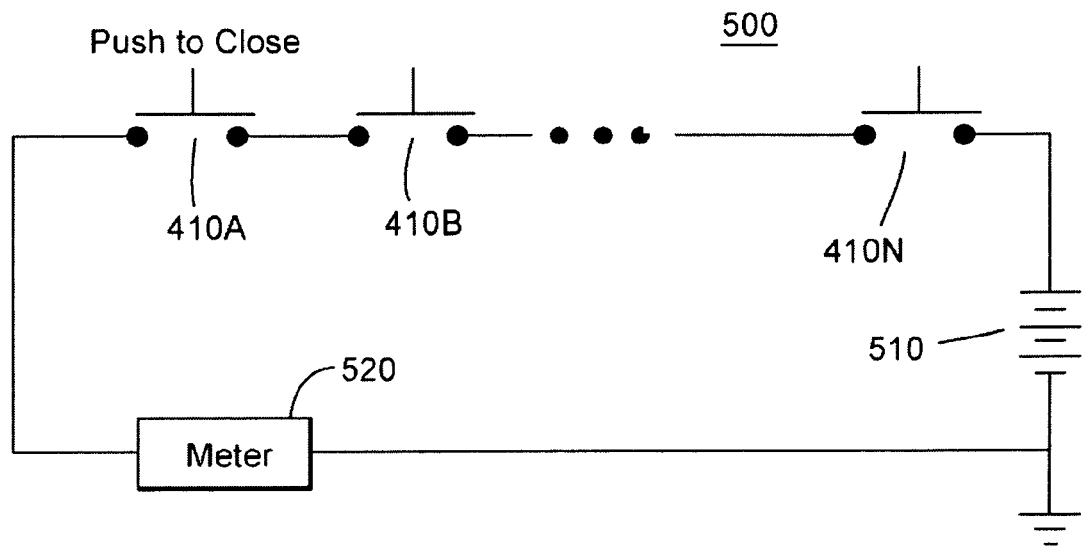
FIG. 5 illustrates an exemplary serial connection diagram in accordance with the principles of the invention.

FIG. 5 illustrates an exemplary serial connection 500 of each switch element 410, associated with individual switches, in FT switch 100 (FIG. 1). In this exemplary serial connection, a power source 510, e.g., a DC source such as a battery, a photocell, or an AC source, such as a rectified AC, provides a voltage to the serial connection of switches 410.A, 410.B ... 410.N. Although a FIG. 5 illustrates a standard electrical symbol for a battery, it would be recognized by those skilled in the art that the power source may be selected from a plurality of power sources, whether the source provides AC or DC voltage. Meter 520 records essentially the voltage of battery 510 when all of the switches are in a closed position. The output of meter 520 may also be provided to an external device (not shown). The external device may represent a network connection that provides the output of meter 520 to a remote device (not shown). The network connection may represent a conventional wired network connection, e.g., serial port, parallel port to connect to a Local Area Network, a Wide-Area Network, a public network (Internet) or a private network. Or the network connection may represent a wireless network connection to allow connection to a Wi-Fi network, wireless LAN, cellular, and/or satellite network. The output of meter 520 may also be provided to a display (not shown). In this case, when one switch is in an incorrect position, then the whole FT switch is indicated to be in an incorrect configuration.

Figure 6:
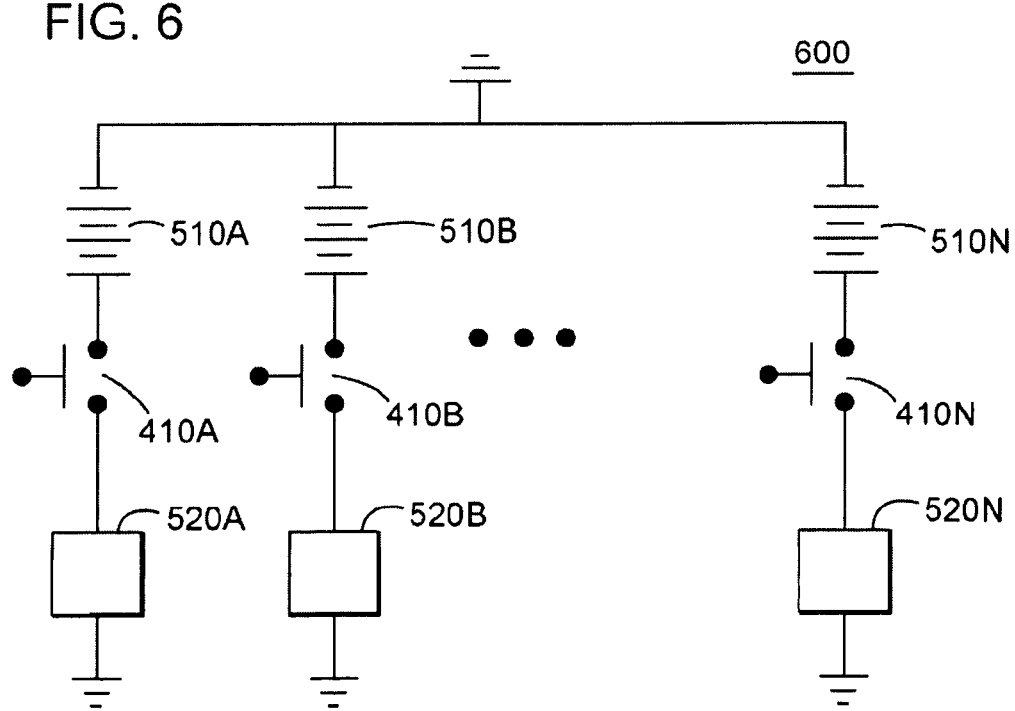
FIG. 6 illustrates an exemplary parallel connection diagram in accordance with the principles of the invention.

FIG. 6 illustrates an exemplary parallel connection wherein individual power sources (batteries) 510.A-510.N provides electrical current to corresponding switches 410.A-410.N. Each of the switches 410.A-410.N is further connected to corresponding meters 520.A-520N. In this case, monitoring of individual switch connections is performed to enable the determination of which of the individual switches is incorrectly positioned.

As discussed above, an output of each of the meters 510.A-510.N may be provided to an external device to remotely monitor the configuration of the FT switch.

In another aspect of the invention, a single battery and/or single meter may be sequentially switched to each of the switches 410.A-410.N to reduce the number of components necessary to provide monitoring of individual switches.

Although not shown, it would be recognized that the output of each monitoring switch may be provided to an indicator which indicates one position and/or another position of the corresponding monitoring switch. For example, the indicator may be a light emitting diode (LED), the color of which indicates one or the other position of a corresponding monitoring switch. In addition, the output provided by the monitoring switches may be combined and provided to a single indicator to represent the configuration of the monitored FT switch.

The incorporation of a monitoring switch in an FT switch is advantageous in the elimination of nuisance tripping of relays because of leaving FT switch poles in an OPEN position by operator error. In addition, the use of a monitoring switch is advantageous in that it avoids leaving power equipment unprotected by not fully closing all the poles in the FT switch.

While there has been shown, described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A field test switch comprising:
   a plurality of independent relay switches wherein selected ones of said relay switches are organized to cooperatively operate with each other;
   a monitoring switch associated with each of said relay switches, said relay switches effecting closure of said associated monitoring switch when in a first position, wherein said engaged monitoring switch enables a current to pass therethrough; and
   an output associated with a corresponding monitoring switch, said output being provided to an external device, remotely indicating whether said monitoring switch is in an engaged position.

2. The field test switch of claim 1, wherein said monitoring switches are connected in series.

3. The field test switch of claim 1, wherein said monitoring switches are connected in parallel.

4. The field test switch of claim 1, wherein said output is sensed locally to the FT switch.

5. The field test switch of claim 1, further comprising:
   a network interface for transmitting said output via a network.

6. The field test switch of claim 5, wherein said network is selected from the group consisting of: wired and wireless.

7. The field test switch of claim 1, further comprising: an indicator associated with each of said monitoring switches.

8. The field test switch of claim 7, wherein said indicator is at least one LED, said LED being associated with one of the positions of said monitoring switch.

9. A monitoring assembly for an FT switch, said FT switch comprising a plurality of individual blade switches, said assembly comprising:
   a momentary contact switch associated with each of the individual blade switches, said momentary contact switch providing an output indicative of a position of said contact switch.

10. The assembly of claim 9, wherein said output represents a first indication when a corresponding blade switch is in a first position and represents a second indication when said corresponding blade switch is in a second position.

11. The assembly of claim 9, wherein said output of each momentary contact switch is connected in series.

12. The assembly of claim 9, wherein said output of each momentary contact is connected in parallel.

* * * * *